United States Patent
Baek

(10) Patent No.: US 10,209,746 B2
(45) Date of Patent: Feb. 19, 2019

(54) FOLDABLE DISPLAY DEVICE

(71) Applicant: Samsung Display Co., Ltd., Yongin-Si, Gyeonggi-Do (KR)

(72) Inventor: Sang Min Baek, Asan-Si (KR)

(73) Assignee: Samsung Display Co., Ltd. (KR)

( * ) Notice: Subject to any disclaimer, the term of this patent is extended or adjusted under 35 U.S.C. 154(b) by 7 days.

(21) Appl. No.: 15/473,278

(22) Filed: Mar. 29, 2017

(65) Prior Publication Data
US 2017/0285691 A1 Oct. 5, 2017

(30) Foreign Application Priority Data
Mar. 29, 2016 (KR) .................. 10-2016-0037730

(51) Int. Cl.
*G06F 1/16* (2006.01)
*H05K 5/00* (2006.01)
*H05K 7/00* (2006.01)

(52) U.S. Cl.
CPC .......... *G06F 1/1675* (2013.01); *G06F 1/1616* (2013.01); *G06F 1/1641* (2013.01); *G06F 1/1652* (2013.01)

(58) Field of Classification Search
CPC .... G06F 1/1652; G06F 1/1675; G06F 1/1616; G06F 1/1641
USPC .............. 361/679.21–679.3, 679.55, 679.56; 349/56–60
See application file for complete search history.

(56) References Cited

U.S. PATENT DOCUMENTS

| | | | |
|---|---|---|---|
| 7,180,665 B2* | 2/2007 | Daniel | G06F 1/1601 160/373 |
| 8,369,075 B2* | 2/2013 | Huang | G09F 9/33 248/297.21 |
| 9,013,864 B2* | 4/2015 | Griffin | H04M 1/0216 16/382 |
| 9,504,170 B2* | 11/2016 | Rothkopf | H04M 1/0216 |
| 2006/0107566 A1* | 5/2006 | Van Rens | G09F 9/35 40/515 |
| 2013/0037228 A1* | 2/2013 | Verschoor | G06F 1/1652 160/377 |

FOREIGN PATENT DOCUMENTS

| | | |
|---|---|---|
| JP | 2008-157996 A | 7/2008 |
| KR | 10-2005-0085090 A | 8/2005 |
| KR | 10-1329946 B1 | 11/2013 |
| KR | 10-2014-0099133 A | 8/2014 |

* cited by examiner

*Primary Examiner* — Anthony M Haughton
(74) *Attorney, Agent, or Firm* — Innovation Counsel LLP

(57) ABSTRACT

A display device according to an exemplary embodiment of the present invention includes: a display panel configured to display an image; a first supporting plate positioned to support the display panel thereon, the first supporting plate being rotatable based on a first rotation axis extending in a first direction; a second supporting plate positioned to support the display panel thereon, the second supporting plate being rotatable based on a second rotation axis extending in the first direction so that the first and second supporting plates then face each other with the display panel folded therebetween; and a first tension application unit disposed at the first supporting plate and configured to apply tension to the display panel in a second direction crossing the first direction.

19 Claims, 5 Drawing Sheets

FOLDABLE DISPLAY DEVICE

CROSS-REFERENCE TO RELATED APPLICATION

This application claims priority to, and the benefit of, Korean Patent Application No. 10-2016-0037730 filed in the Korean Intellectual Property Office on Mar. 29, 2016, the entire contents of which are incorporated herein by reference.

BACKGROUND

(a) Technical Field

Embodiments of the present invention relate generally to display devices. More specifically, embodiments of the present invention relate to foldable display devices.

(b) Description of the Related Art

Currently popular display devices include the liquid crystal display (LCD), the plasma display panel (PDP), the organic light emitting diode (OLED) display, the field effect display (FED), and the electrophoretic display (EPD).

The OLED display includes two electrodes and an organic emission layer disposed therebetween. Here, electrons from one electrode and holes from the other electrode combine in the organic emission layer to thereby form excitons, which release energy to emit light.

An organic light emitting diode display has a self-luminous characteristic, and because the organic light emitting diode display does not need a separate light source, unlike a liquid crystal display, it can have a relatively small thickness and weight. Further, the OLED display exhibits high-quality characteristics such as low power consumption, high luminance, and fast response speed, and thus receives attention as a next generation display device.

Recently, flexible display devices that are bendable or foldable have been under development.

However, unfolding a flexible display device currently can result in the display panel floating or partially detaching from a supporting plate supporting the display panel.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device in which the display panel is prevented from floating from the supporting plate supporting the display panel when unfolding the display panel.

A display device according to an exemplary embodiment of the present invention includes: a display panel configured to display an image; a first supporting plate positioned to support the display panel thereon, the first supporting plate being rotatable based on a first rotation axis extending in a first direction; a second supporting plate positioned to support the display panel thereon, the second supporting plate being rotatable based on a second rotation axis extending in the first direction so that the first and second supporting plates then face each other with the display panel folded therebetween; and a first tension application unit disposed at the first supporting plate and configured to apply tension to the display panel in a second direction crossing the first direction.

The first tension application unit may be positioned at a side of the first supporting plate that is opposite to a side of the first supporting plate at which that the first rotation axis is positioned.

The first tension application unit may include a first roller having a surface to which a side of the display panel is coupled, and a first winder coupled to the first roller and configured to rotate the first roller.

The first roller may be disposed to be parallel to the first rotation axis.

The first winder may include a spring.

The first rotation axis and the second rotation axis may be separated by a predetermined interval.

The first supporting plate and the second supporting plate may be formed such that they face each other.

The first supporting plate and the second supporting plate may be substantially quadrangular.

The first supporting plate may further include a first groove formed in a surface of the first supporting plate that faces the display panel.

The first groove may be positioned proximate to the first rotation axis.

A width of the first groove in the first direction may be equal to or larger than a width of the display panel in the first direction.

A second tension application unit disposed at the second supporting plate and configured to apply tension to the display panel in the second direction may be further included.

The second tension application unit may be positioned at a side of the second supporting plate that is opposite to a side of the second supporting plate at which the second rotation axis is positioned.

The second tension application unit may include a second roller having a surface to which a side of the display panel is coupled, and a second winder coupled to the second roller and configured to rotate the second roller.

The second roller may be disposed to be parallel to the second rotation axis.

The second winder may include a spring.

The second supporting plate may further include a second groove formed at a second surface of the second supporting plate that faces the display panel.

The second groove may be positioned proximate to the second rotation axis.

A width of the second groove in the first direction may be equal to or larger than a width of the display panel in the first direction.

According to the above-described display device, when unfolding the display panel, the display panel is close to the supporting plate supporting the display panel, thereby preventing the display panel from being lifted from the supporting plate.

Also, damage to the display panel may be prevented by reducing the stress applied to the bending region of the display panel.

DETAILED DESCRIPTION OF THE EMBODIMENTS

Figure 1:
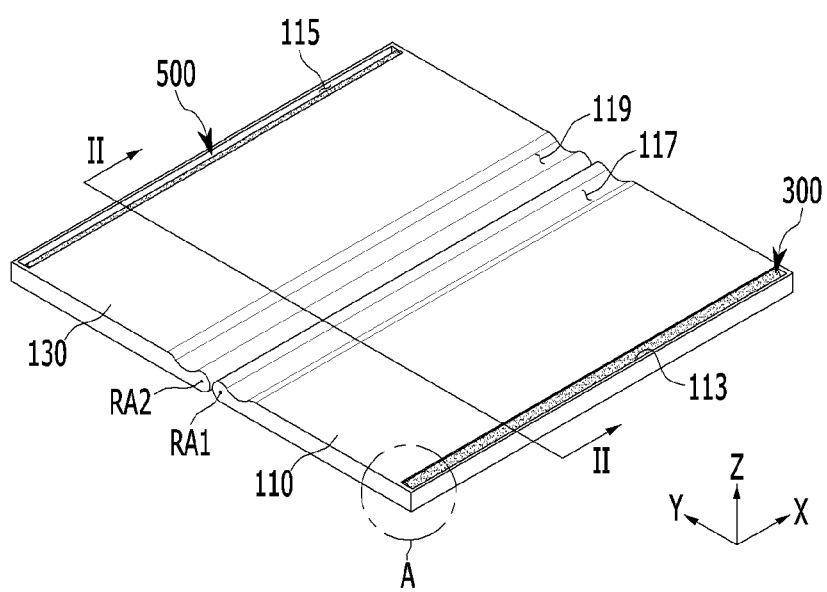
FIG. 1 is a schematic perspective view of a display device according to an exemplary embodiment of the present invention.

Hereinafter, exemplary embodiments of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, the size and thickness of each component shown in the drawings are arbitrarily shown for better understanding and ease of description, but the present invention is not limited thereto.

In the drawings, the thickness of layers, films, panels, regions, etc., are exaggerated for clarity. In the drawings, for better understanding and ease of description, the thickness of some layers and areas is exaggerated. The drawings are thus not necessarily to scale. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Furthermore, when a first part is described as being arranged "on" a second part, this indicates that the first part is arranged at an upper side or a lower side of the second part without the limitation to the upper side thereof on the basis of the gravity direction.

All numerical values are approximate, and may vary. All examples of specific materials and compositions are to be taken as nonlimiting and exemplary only. Other suitable materials and compositions may be used instead.

Next, a display device according to an exemplary embodiment of the present invention will be described with reference to FIG. 1 to FIG. 3.

Figure 2:
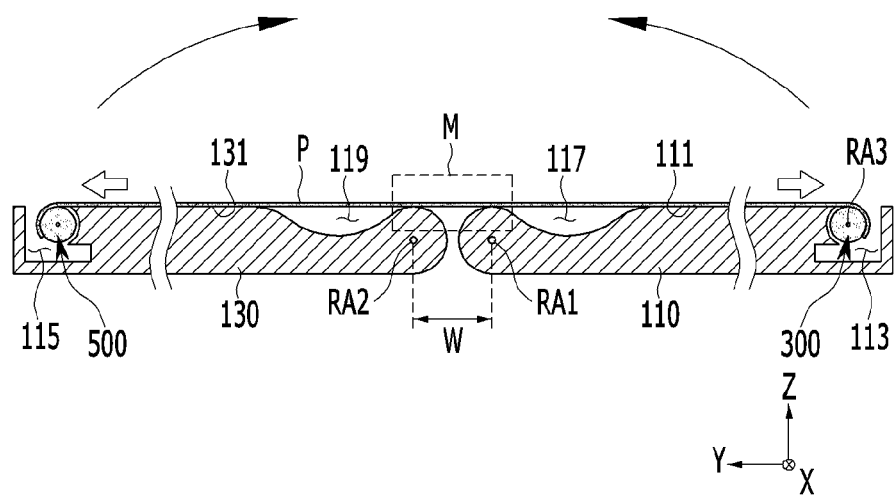
FIG. 2 is a cross-sectional view taken along a line II-II of FIG. 1.
Figure 3:
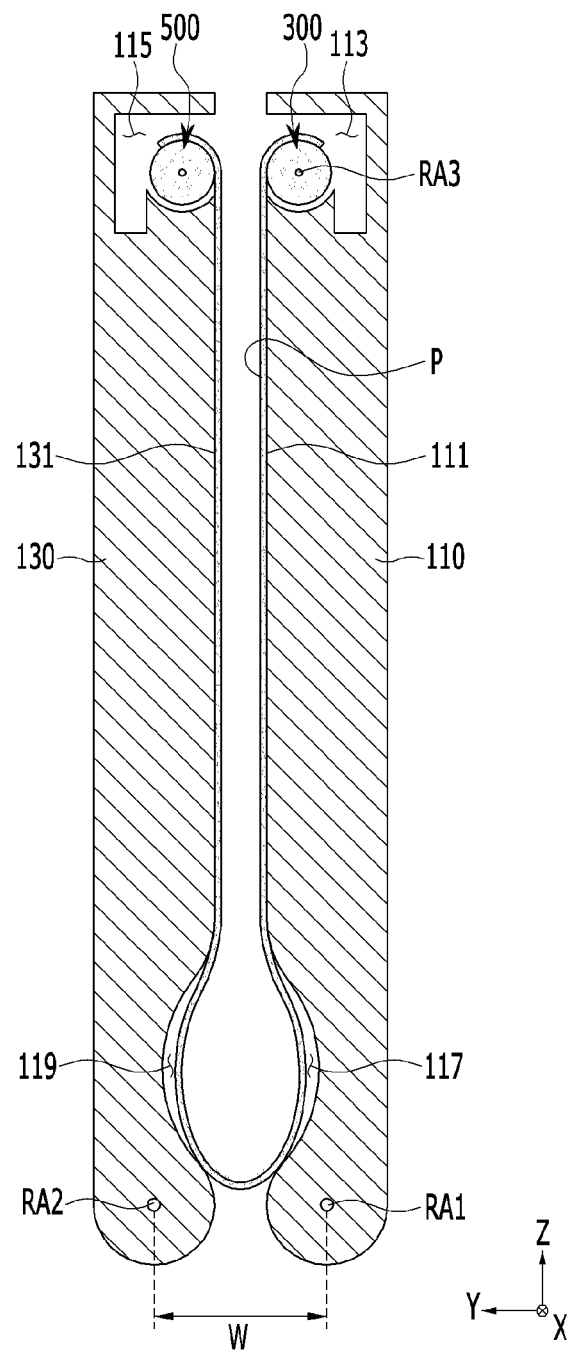
FIG. 3 is a cross-sectional view showing a state in which the display device of FIG. 2 is folded.

FIG. 1 is a schematic perspective view of a display device according to an exemplary embodiment of the present invention, FIG. 2 is a cross-sectional view taken along a line II-II of FIG. 1, and FIG. 3 is a cross-sectional view showing a state in which the display device of FIG. 2 is folded. However, in FIG. 1, an illustration of the display panel P is omitted for clarity.

Referring to FIG. 1 to FIG. 3, the display device according to the present exemplary embodiment includes a display panel P, a first supporting plate 110, a second supporting plate 130, a first tension application unit 300, and a second tension application unit 500. In the present exemplary embodiment, the display panel P may be folded or unfolded by rotation of the first supporting plate 110 relative to the second supporting plate 130, and when the display panel P is unfolded, the display panel P may be maintained to be flat by the first tension application unit 300 and the second tension application unit 500.

The display panel P may emit light to display an image. In this case, the display panel P, in addition to being a display panel of an organic light emitting diode (OLED) display, may alternatively be employ a liquid crystal display (LCD), a plasma display panel (PDP), an electric field effect display (FED) device, an electrophoretic display (EPD), and the like.

The display panel P is disposed on both the first supporting plate 110 and the second supporting plate 130. A shape of the display panel P may be changed by rotation of the first supporting plate 110 and the second supporting plate 130 that support the display panel P. For example, when the first supporting plate 110 and the second supporting plate 130 are coplanar, the display panel P is unfolded. In contrast, if the first supporting plate 110 and the second supporting plate 130 face parallel to each other, the display panel P is folded.

Referring to FIG. 1 and FIG. 2, the first supporting plate 110 may have a plate shape. In this case, a first surface 111 of the first supporting plate 110 is in contact with the display panel P and may be flat. When the first surface 111 of the first supporting plate 110 is flat, the surface of the display panel P supported by the first supporting plate 110 may be flat. That is, unevenness or bending of the surface of the display panel P may be prevented.

Also, as shown in FIG. 1, the first supporting plate 110 may form a quadrangular plane by corresponding to a half of the display panel P. In FIG. 1, for convenience of description, the display panel P positioned on the first supporting plate 110 and the second supporting plate 130 is omitted.

In this case, an area of the first supporting plate 110 may be formed to be equal to or larger than half of the display panel P. Accordingly, the first supporting plate 110 may support half of the display panel P. Here, the area of the first supporting plate 110 represents an area parallel to the plane formed by an X-axis and a Y-axis in FIG. 1.

On the other hand, referring to FIG. 2, the first supporting plate 110 may be rotated based on the first rotation axis RA1. The first rotation axis RA1 may be positioned at a left side of the first supporting plate 110 and may be disposed to be parallel to the first direction. Here, the first direction represents the X-axis of the coordinates shown in FIGS. 1 and 2. Also, the first rotation axis RA1 shown in FIG. 1 to FIG. 3 corresponds to an imaginary line that is a reference when the first supporting plate 110 is rotated.

Like the first supporting plate 110, the second supporting plate 130 may also have a plate shape. A second surface 131 of the second supporting plate 130 in contact with the display panel P may be flat. As the first surface 111 of the first supporting plate 110 and the second surface 131 of the second supporting plate 130 are both flat, as shown in FIG. 2, the entire surface of the display panel P may be maintained substantially flat.

On the other hand, as shown in FIG. 1, the second supporting plate 130 corresponds to the shape of half of the display panel P, thereby forming a quadrangular plane.

In this case, the area of the second supporting plate 130 may be formed to be equal to or larger than half of the display panel P. Like the first supporting plate 110, the second supporting plate 130 may support the other half of the display panel P. Here, like the area of the first supporting plate 110, the area of the second supporting plate 130 represents an area parallel to the plane formed by the X-axis and the Y-axis.

When the first supporting plate 110 and the second supporting plate 130 are unfolded so as to be coplanar, the collective shape formed by the first supporting plate 110 and the second supporting plate 130 may be a quadrangle corresponding to the entire shape of the display panel P.

In this case, the collective area of the first supporting plate 110 and the second supporting plate 130 may be formed to be equal to or larger than the entire area of the display panel P. Accordingly, the first supporting plate 110 and the second supporting plate 130 may support the entire display panel P.

The second supporting plate 130 may be rotated based on the second rotation axis RA2. The second rotation axis RA2 may be positioned at the right side of the second supporting plate 130 and may be disposed to be parallel to the first rotation axis RA1. That is, the first rotation axis RA1 and the second rotation axis RA2 may each be disposed to be parallel to the first direction. In this case, the second rotation axis RA2 shown in FIG. 1 to FIG. 3 corresponds to an imaginary line that is a reference when the second supporting plate 130 is rotated, similar to the first rotation axis RA1.

Referring to FIG. 2 and FIG. 3, while the first supporting plate 110 and the second supporting plate 130 are respectively rotated based on the first rotation axis RA1 and the second rotation axis RA2, the first supporting plate 110 and the second supporting plate 130 may be rotated so as to be coplanar, or the first surface 111 of the first supporting plate 110 and the second surface 131 of the second supporting plate 130 may be disposed to face each other.

In detail, as shown in FIG. 2, if the first supporting plate 110 and the second supporting plate 130 are coplanar, an angle formed by the first surface 111 of the first supporting plate 110 and the second surface 131 of the second supporting plate 130 is about 180 degrees. Also, if the first supporting plate 110 is rotated in a counterclockwise direction based on the first rotation axis RA1 and the second supporting plate 130 is rotated in a clockwise direction based on the second rotation axis RA2, as shown in FIG. 3, the angle formed by the first surface 111 and the second surface 131 is about 0 degrees.

According to the present exemplary embodiment, the first supporting plate 110 is rotated in the counterclockwise direction based on the first rotation axis RA1, from an initial orientation parallel to the Y-axis. Also, when the second supporting plate 130 is initially oriented parallel to the Y-axis, the second supporting plate 130 is only rotated in the clockwise direction based on the second rotation axis RA2. That is, when the first supporting plate 110 and the second supporting plate 130 are disposed as shown in FIG. 2, the first supporting plate 110 may not be rotated in the clockwise direction based on the first rotation axis RA1, and the second supporting plate 130 may not be rotated in the counterclockwise direction based on the second rotation axis RA2.

Accordingly, as shown in FIG. 3, two halves of the display panel P may be disposed to face each other. Thus, if the first supporting plate 110 and the second supporting plate 130 are rotated and disposed to face each other, the display panel P is positioned in the folded state between the first supporting plate 110 and the second supporting plate 130.

Again referring to FIG. 1 and FIG. 2, the first tension application unit 300 applying a tension to the display panel P may be disposed in the first supporting plate 110. The first tension application unit 300 applies tension to the display panel P at the edge of the display panel P along a second direction crossing the first direction. Here, the second direction represents the Y-axis of the coordinates in the drawing.

In this case, the first tension application unit 300 may be positioned at the opposite side of the first supporting plate 110 as the first rotation axis RA1. As shown in FIG. 2, the first rotation axis RA1 may be formed at the left side of the first supporting plate 110, and the first tension application unit 300 may be formed at the right side of the first supporting plate 110.

Also, the first tension application unit 300 may be disposed in a first receiving part 113 formed at the right side of the first supporting plate 110. The first receiving part 113 may be a groove shaped feature at the right side of the first supporting plate 110.

The second tension application unit 500 applies tension to the display panel P and may be disposed in the second supporting plate 130. The second tension application unit 500 applies tension to the display panel P at the edge of the display panel P along the second direction.

In this case, the second tension application unit 500 may be positioned at the opposite side of the second supporting plate 130 as the second rotation axis RA2. As shown in FIG. 2, the second rotation axis RA2 is disposed at the right side of the second supporting plate 130, and the second tension application unit 500 is disposed at the left side of the second supporting plate 130.

Also, the second tension application unit 500 may be disposed in a second receiving part 115 formed at the left side of the second supporting plate 130. Like the first receiving part 113, the second receiving part 115 may be formed as a groove shaped feature at the left side of the second supporting plate 130.

In the present exemplary embodiment, the first tension application unit 300 and the second tension application unit 500 apply tension to the display panel P in opposite directions to each other. For example, in FIG. 2, the first tension application unit 300 applies tension in the right direction and the second tension application unit 500 applies tension in the left direction.

Referring to FIG. 2, when the first supporting plate 110 and the second supporting plate 130 are unfolded to be coplanar, the display panel P may be lifted in a neighborhood region M of the first rotation axis RA1 and the second rotation axis RA2. For example, the display panel P may be separated from the first supporting plate 110 and the second supporting plate 130 in a third direction without being in contact therewith. If the display panel P is separated from the first supporting plate 110 and the second supporting plate 130, bending is generated on the display panel P such that the image emitted from the display panel P may be distorted. Here, the third direction represents a Z-axis in the coordinates in the drawing.

However, according to the present exemplary embodiment, since the first tension application unit 300 and the second tension application unit 500 apply tension to the display panel P, the display panel P may be close to the first supporting plate 110 and the second supporting plate 130. That is, the first tension application unit 300 and the second tension application unit 500 improve flatness of the display panel P, thereby preventing distortion of the image emitted from the display panel P.

Figure 4:
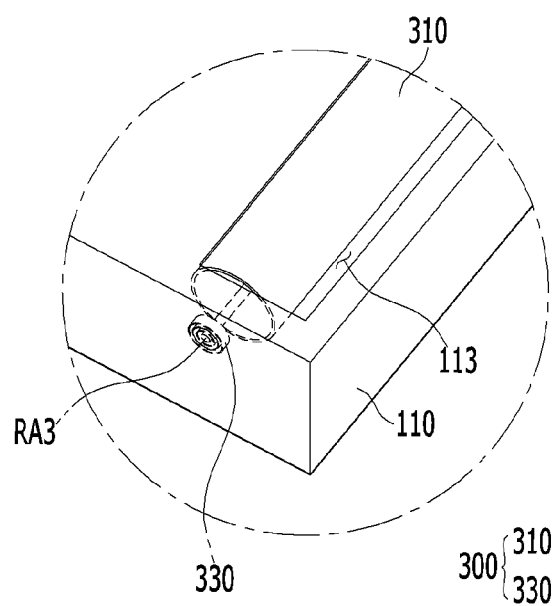
FIG. 4 is an enlarged view of a region A of FIG. 1.

Referring to FIG. 2 and FIG. 4, the first tension application unit 300 may include a first roller 310 and a first winder 330.

One end part of the display panel P is bonded to an external circumferential surface of the first roller 310. In FIG. 4, if the first roller 310 is rotated in the clockwise direction based on the third rotation axis RA3, tension may be applied to the display panel P.

In this case, the first winder 330 is bonded to the first roller 310, thereby rotating the first roller 310 in the clockwise direction. According to the present exemplary embodiment, the first winder 330 may employ a spring. The spring is a thin steel strip that is rolled and bonded to the first roller 310, and the first roller 310 may be rotated in the clockwise direction by a force when the thin steel strip is unrolled.

The second tension application unit 500 may be formed with the same configuration as the first tension application unit 300. That is, the second tension application unit 500 may include a second roller and a second winder. The second tension application unit 500 has the same configuration as the first tension application unit 300 such that the detailed description thereof is omitted.

Referring to FIG. 1 and FIG. 2, a first groove 117 may be formed close to the first rotation axis RA1 at the first surface 111 of the first supporting plate 110. The first groove 117 is formed to extend along the first direction. A width of the first groove 117 in the first direction may be formed to be the same as the width of the display panel P in the first direction or to be larger than the width of the display panel P in the first direction. Accordingly, when the display panel P is folded, part of the display panel P may be bent or extend into the first groove 117. Further description thereof exists below.

On the other hand, a second groove 119 may be formed close to the second rotation axis RA2 at the second surface 131 of the second supporting plate 130. The second groove 119 is formed to extend along the first direction. The width of the second groove 119 in the first direction, like the first groove 117, may be formed to be the same as the width of the display panel P in the first direction or to be larger than the width of the display panel P in the first direction. Accordingly, when folding the display panel P, part of the display panel P may be drop into the second groove 119.

Referring to FIG. 3, if the first supporting plate 110 and the second supporting plate 130 are disposed to face each other, the display panel P is bent in the region close to the first rotation axis RA1 and the second rotation axis RA2. In this case, part of the display panel P is bent and enters into the first groove 117 and the second groove 119. Accordingly, the stress generated in the bending of the display panel P may be reduced.

In detail, in the present exemplary embodiment, the radius of curvature of the display panel P may be increased in the bending region by the first groove 117 and the second groove 119. If the first groove 117 and the second groove 119 are not formed in the display panel P, the radius of curvature of the display panel P in the bending region is smaller than the curvature of the display panel P in the present exemplary embodiment. In the present exemplary embodiment, increasing the radius of curvature of the display panel P in the bending region can reduce the stress generated at the display panel P in the bending region.

Meanwhile, referring to FIG. 2 and FIG. 3, the first rotation axis RA1 and the second rotation axis RA2 may be disposed to be separated by a predetermined interval W. In this case, to control the curvature of the display panel P of the bending region, the interval W may be controlled. For example, if the interval W increases, the radius of curvature of the display panel P of the bending region may be increased, and in contrast, if the interval W decreases, the radius of curvature of the display panel P of the bending region may be reduced.

Next, the display device according to another exemplary embodiment of the present invention will be described with reference to FIG. 5. When describing the current exemplary embodiment, detailed description of the same configurations as in the above-described exemplary embodiment is omitted.

Figure 5:
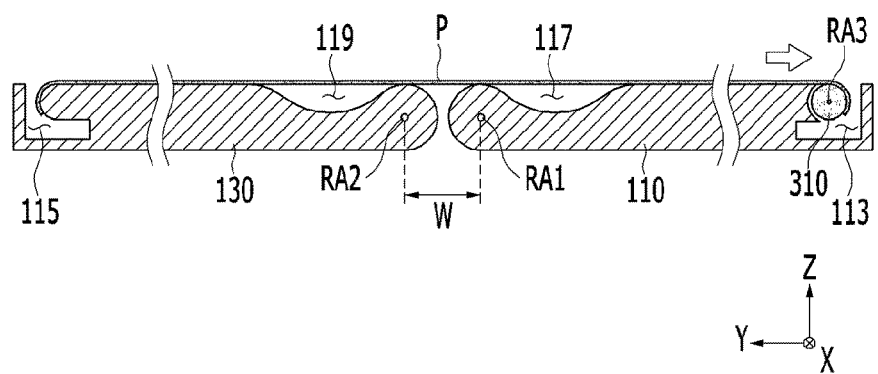
FIG. 5 is a cross-sectional view of a display device according to another exemplary embodiment of the present invention.

FIG. 5 is a cross-sectional view of a display device according to another exemplary embodiment of the present invention.

Referring to FIG. 5, different from the above-described exemplary embodiment, the first tension application unit 300 is only formed in the first supporting plate 110. That is, the tension application unit made of the roller and the winder is not formed in the second supporting plate 130.

In the present exemplary embodiment, the display panel P positioned at the second supporting plate 130 is fixed and bonded to the left side of the second supporting plate 130. Also, the first tension application unit 300 is positioned at the right side of the first supporting plate 110.

When the first supporting plate 110 and the second supporting plate 130 are unfolded to be coplanar, the first tension application unit 300 applies tension to the display panel P at the edge of the display panel P along the second direction. Accordingly, the display panel P may be close to the first supporting plate 110 and the second supporting plate 130. The first tension application unit 300 and the second tension application unit 500 improve the flatness of the display panel P, and distortion of the image emitted from the display panel P may thus be prevented.

In the display device according to an exemplary embodiment of the present invention, the first tension application unit 300 and the second tension application unit 500 are disposed at the first supporting plate 110 and the second supporting plate 130, respectively, thereby the display panel P may be prevented from being lifted from the first supporting plate 110 and the second supporting plate 130. Also, when folded, part of the display panel P is bent into the first groove 117 of the first supporting plate 110 and the second groove 119 of the second supporting plate 130, thereby reducing the stress applied to the display panel P in the bending region.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

DESCRIPTION OF SYMBOLS

RA1 first rotation axis
RA2 second rotation axis
RA3 third rotation axis
P display panel
110 first supporting plate
111 first surface
113 first receiving part
115 second receiving part
130 second supporting plate
131 second surface
300 first tension application unit
310 first roller
330 first winder
500 second tension application unit

What is claimed is:
1. A display device comprising:
a display panel configured to display an image;
a first supporting plate positioned to support the display panel thereon, the first supporting plate being rotatable based on a first rotation axis extending in a first direction;

a second supporting plate positioned to support the display panel thereon, the second supporting plate being rotatable based on a second rotation axis extending in the first direction so that the first and second supporting plates then face each other with the display panel folded therebetween; and a first tension application unit disposed at the first supporting plate and configured to apply tension to the display panel in a second direction crossing the first direction, wherein the first tension application unit includes:

a first roller having a surface to which a side of the display panel is bonded to and in contact with; and a first winder directly coupled to the first roller and configured to rotate the first roller.

2. The display device of claim 1, wherein
the first tension application unit is positioned at a side of the first supporting plate that is opposite to a side of the first supporting plate at which the first rotation axis is positioned.

3. The display device of claim 1, wherein
the first roller is disposed to be parallel to the first rotation axis.

4. The display device of claim 1, wherein
the first winder includes a spring.

5. The display device of claim 1, wherein
the first rotation axis and the second rotation axis are separated by a predetermined interval.

6. The display device of claim 1, wherein
the first supporting plate and the second supporting plate are formed such that they face each other.

7. The display device of claim 6, wherein
the first supporting plate and the second supporting plate are substantially quadrangular.

8. The display device of claim 1, wherein
the first supporting plate further comprises a groove formed in a surface of the first supporting plate that faces the display panel.

9. The display device of claim 8, wherein
the groove is positioned proximate to the first rotation axis.

10. The display device of claim 8, wherein
a width of the groove in the first direction is equal to or larger than a width of the display panel in the first direction.

11. The display device of claim 1, further comprising
a second tension application unit disposed at the second supporting plate and configured to apply tension to the display panel in the second direction.

12. The display device of claim 11, wherein
the second tension application unit is positioned at a side of the second supporting plate that is opposite to a side of the second supporting plate at which the second rotation axis is positioned.

13. The display device of claim 12, wherein
the second tension application unit includes:
a second roller having a surface to which a side of the display panel is coupled; and
a second winder coupled to the second roller and configured to rotate the second roller.

14. The display device of claim 13, wherein
the second roller is disposed to be parallel to the second rotation axis.

15. The display device of claim 13, wherein
the second winder includes a spring.

16. The display device of claim 1, wherein
the second supporting plate further comprises a second groove formed at a surface of the second supporting plate that faces the display panel.

17. The display device of claim 16, wherein
the groove is positioned proximate to the second rotation axis.

18. The display device of claim 17, wherein
a width of the groove in the first direction is equal to or larger than a width of the display panel in the first direction.

19. A display device comprising:
a display panel configured to display an image;
a first supporting plate positioned to support the display panel thereon, the first supporting plate being rotatable based on a first rotation axis extending in a first direction;
a second supporting plate positioned to support the display panel thereon, the second supporting plate being rotatable based on a second rotation axis extending in the first direction so that the first and second supporting plates then face each other with the display panel folded therebetween; and
a first tension application unit disposed at the first supporting plate and configured to apply tension to the display panel in a second direction crossing the first direction,
wherein the first supporting plate comprises a first groove formed in a surface of the first supporting plate that faces the display panel and the first groove is positioned proximate to the first rotation axis,
wherein the first tension application unit and at least a portion of the display panel are disposed in a second groove formed in a surface of the first supporting plate on an end of the first supporting plate opposite of the first rotation axis.

* * * * *